(12) United States Patent
Huber (10) Patent No.: US 7,231,087 B2
(45) Date of Patent: Jun. 12, 2007

(54) MATCHING BINARY TEMPLATES AGAINST RANGE MAP DERIVED SILHOUETTES FOR OBJECT POSE ESTIMATION

(75) Inventor: Eric Huber, Houston, TX (US)

(73) Assignee: Metrica, Inc., San Antonio, TX (US)

( * ) Notice: Subject to any disclaimer, the term of this patent is extended or adjusted under 35 U.S.C. 154(b) by 797 days.

(21) Appl. No.: 10/696,213

(22) Filed: Oct. 29, 2003

(65) Prior Publication Data

US 2004/0096096 A1 May 20, 2004

(51) Int. Cl.
*G06K 9/68* (2006.01)

(52) U.S. Cl. .................. 382/222; 382/103; 382/106; 382/217

(58) Field of Classification Search ............ 382/222, 382/103, 106, 217
See application file for complete search history.

(56) References Cited

U.S. PATENT DOCUMENTS

| | | | |
|---|---|---|---|
| 5,214,718 A * | 5/1993 | Khosla | 382/166 |
| 5,828,769 A | 10/1998 | Burns | |
| 6,026,189 A | 2/2000 | Greenspan | |
| 6,477,275 B1 | 11/2002 | Melikian et al. | |
| 6,526,165 B1 | 2/2003 | Montillo et al. | |
| 7,003,134 B1 * | 2/2006 | Covell et al. | 382/103 |
| 7,043,056 B2 * | 5/2006 | Edwards et al. | 382/103 |

OTHER PUBLICATIONS

Gause et al. "Reconfigurable Shape-Adaptive Template Matching Architectures," IEEE FPGA Custom Computing Machine Conference, 10 pages (2002).
Hoff et al. "Pose Estimation of Artificial Knee Implants in fluoroscopy Images Using A Template Matching Technique," 3rd IEEE Workshop on Applications of Computer Vision, pp. 1-7 (1996).
Fromherz et al. "Multiple Depth Maps For Object Matching Under Varying Pose," 5 pages (date unknown).
McKenna et al. "Tracking Groups of People," Department of Applied Computing, University of Dundee; Department of Computer Science, George Mason University; Center for Automation Research, University of Maryland, pp. 1-15 (date unknown).

* cited by examiner

*Primary Examiner*—Matthew C. Bella
*Assistant Examiner*—Mike Rahmjoo
(74) *Attorney, Agent, or Firm*—Tarolli, Sundheim, Covell & Tummino LLP (57) ABSTRACT

A method for approximating an object's pose from a camera generated image of a scene is performed by first extracting a binary map from the image. The binary map is filtered to include silhouettes of objects located within a predetermined range of distances from the camera. An initial binary shape template may be applied to the binary map to locate potential target object silhouettes. Iterative stages of binary templates are applied to the each target object silhouette that represent a range of poses of the target object. Each stage of templates has higher spatial fidelity than the previous stage and poses corresponding to templates that do not sufficiently match the silhouette are eliminated from consideration. The target object's pose is approximated based on a set of templates that best matches the target object silhouette.

8 Claims, 6 Drawing Sheets

MATCHING BINARY TEMPLATES AGAINST RANGE MAP DERIVED SILHOUETTES FOR OBJECT POSE ESTIMATION

TECHNICAL FIELD

The invention relates generally to the field of computerized image recognition and more particularly to a system for recognizing the pose of a target object.

BACKGROUND OF THE INVENTION

Object recognition is an important aspect of robotic vision systems. In a manufacturing environment, robots are often required to detect the pose of a part or tool. Because of variations in the appearance of the part due to light conditions or other factors, consistently recognizing the part's pose can be difficult.

Several techniques have been employed in the field of computer vision systems to enable recognition of an object under varying conditions. U.S. Pat. No. 6,026,189 to Greenspan discloses a method for recognizing objects within an image that utilizes a data tree that stores, as nodes on the tree, surface features of the object being recognized. To determine if a detected object is the desired object, the tree is searched by evaluating whether the detected object meets the criteria of a node and proceeding along the tree based on the decision at each node. This technique matches three dimensional range data to stored three dimensional maps and can be memory intensive.

U.S. Pat. No. 6,477,275 to Melikian et al. discloses another technique for locating an object in an image. In the Melikian method, a template for the desired object is shifted over sub portions of the image and a correlation of the sub portion to the image is measured. This technique requires grey scale processing capabilities. U.S. patent No. to Montillo et al. discloses a method for determining the exact location of pads on a printed circuit board once an approximate position on the circuit board has been input by an operator. The Montillo technique is relatively simple, and compares the locations of predetermined "anchor points" on the circuit board being tested with stored locations.

SUMMARY OF THE INVENTION

The pose of an object can be accurately and efficiently estimated by extracting a binary range map from an image and performing a multi-stage binary template search of the binary range map to recognize the object and its orientation.

BRIEF DESCRIPTION OF THE DRAWINGS

FIGS. 4a1–4d5 illustrate a pose estimation sequence for the wrench of FIG. 1 according to an embodiment of the present invention;

DETAILED DESCRIPTION OF THE PREFERRED EMBODIMENT

To approximate the pose of a target object from an image of a scene a binary range map is generated and a series of binary templates are applied to the target object in the binary range map. Each set of binary templates contains more detailed information about a candidate pose for the target object and a match value score for each candidate pose is calculated using both shape and mask templates. Candidate poses having low match value scores are eliminated while candidate poses with higher match value scores are further probed using additional sets of more detailed binary templates. The binary templates are generated by rotating the target object silhouette about various axes and creating a shape and mask template from the rotated silhouettes.

Binary Range Maps

Figure 1:
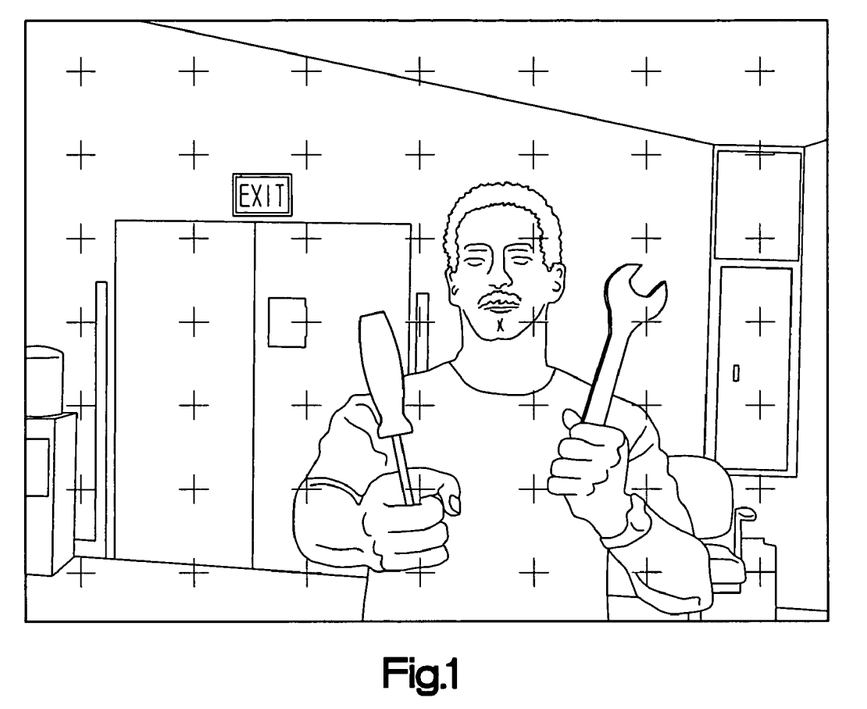
FIG. 1 is an outline drawing of an image of a man holding a wrench and a screwdriver that, as part of an example of one embodiment of the present invention, are sought to be recognized by the pose estimation system of the present invention.
Figure 2A:
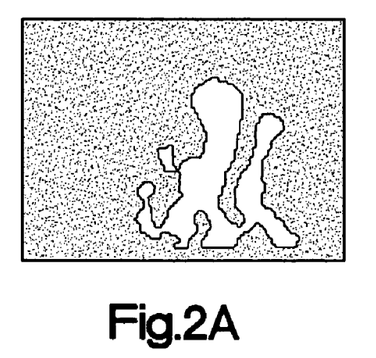
FIGS. 2A–2E are binary depth maps of the image of FIG. 1 filtered at various depths according to an embodiment of the present invention.
Figure 2B:
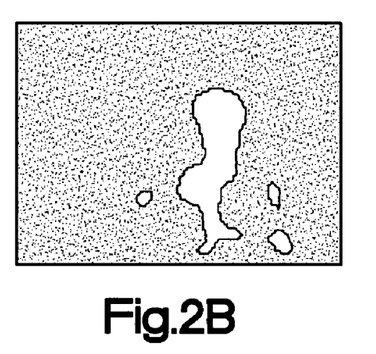
Figure 2C:
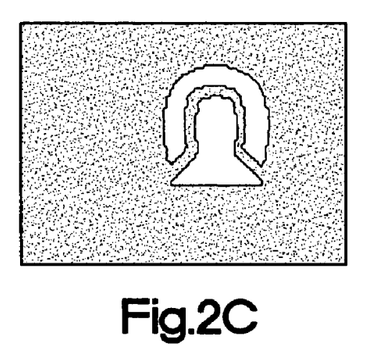
Figure 2D:
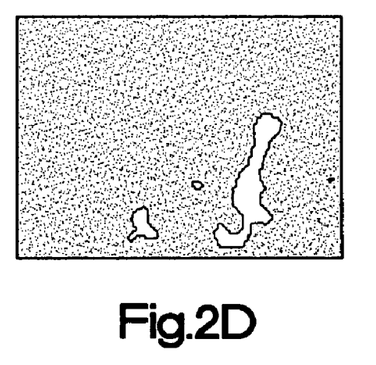
Figure 2E:
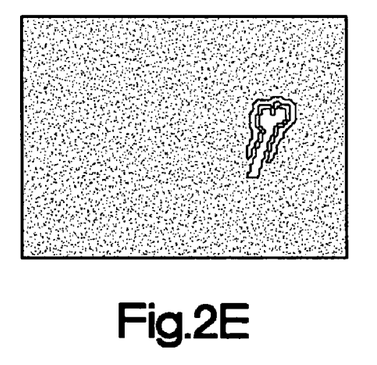

A binary range map is a two-dimensional array of distance measurements corresponding to points within a scene. There are a number of devices and methods for obtaining binary range maps, any of which can be used to practice the present invention, including: stereo camera, scanning laser, depth from ego-motion, and LIDAR. FIG. 1 is an outline drawing of an image of a man holding a wrench and a screwdriver at different distances from a camera. FIGS. 2A–2E are binary range maps at various ranges of the image shown in FIG. 1. Each bit of the binary maps in FIG. 2 corresponds to a point in the scene, and indicates whether surface material was measured within the specifically targeted distance range. To produce the binary map, a conventional depth map is band-filtered. For instance, if the object being searched for is between 3 and 5 meters away, individual depth measurements undergo band (high and low) thresholding to produce a binary depth map selective to that range. In the resulting binary map, surfaces of any objects within the range of 3 to 5 meters are represented by a value of 1, everything else gets set to 0. For example, FIG. 2A is a binary map of the image of FIG. 1 filtered to include objects between 3 and 5 meters from the camera. FIG. 2B is a binary map filtered at "human depth" and FIG. 2E is a binary map filtered at wrench depth.

Shape Templates

Templates are used by the computer vision community to interrogate an image for specific object views or artifacts, such as shape, color, shading, or line intersections. Templates can be either synthetically generated or taken from imagery of real target objects at specific orientations and/or distances. Often the templates are matched against many different portions of an image, representing different points within the 3D environment, in an attempt to find strong correlations (match values) that may reveal the target object's location.

When templates are used to match to objects in a range map, correlation match value scores are produced. Higher correlation match value scores represent better matches. Once all match stages are complete, only the highest match value score(s) represent likely locations and poses for target objects in the scene. The correlation match value score is calculated as the number of elements that match (correlation area) divided by the number of potential match (mask area) elements.

A mask template is used to control which regions of the shape template are applied to matching. The mask template includes both the silhouette region and the halo region. There are competing factors contributing to optimal shape, size, and location for the halo regions. These regions are most effective if they remain free of object matter while remaining as close to the silhouette as possible. To ensure that the object does not overlap its own halo region, only elements outside of the silhouette probability profile are used. Within this constraint, elements closest to the object center are chosen to form halo regions.

Figure 7:
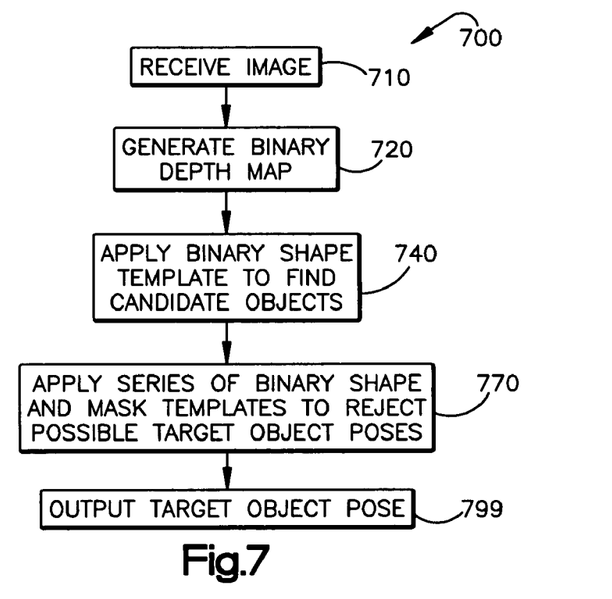
FIG. 7 is a flowchart representation of a method for object pose estimation according to an embodiment of the present invention.

Referring now to FIG. 7, a flowchart representation of a pose estimation algorithm 700 that is used to practice a preferred embodiment of the pose estimation technique is depicted. In step 710 an image is received from a vision system and in step 720 a binary depth map is generated from the image at a range in which the targeted object is expected. In step 740 an initial binary shape template is applied to the binary map to locate candidate objects that may be the target object. In many instances a priori knowledge about the target object's location, i.e. that it is being held by a robotic arm, makes it unnecessary to locate candidate objects and the method skips to step 770 where binary shape and mask templates are applied to the target object to estimate its pose.

Figure 3A:
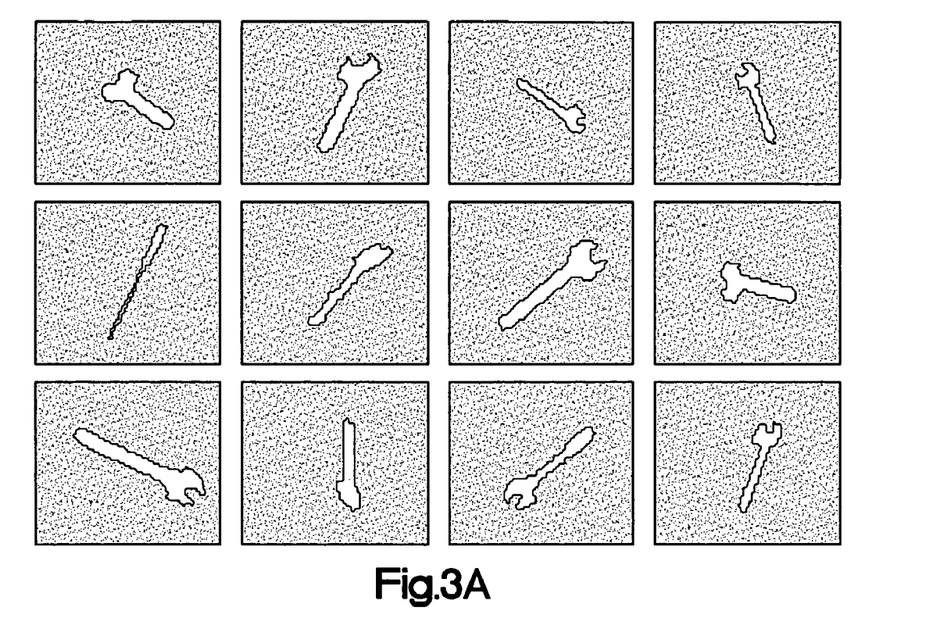
FIGS. 3A and 3B are examples of shape and mask templates for the wrench of FIG. 1 according to an embodiment of the present invention.
Figure 3B:
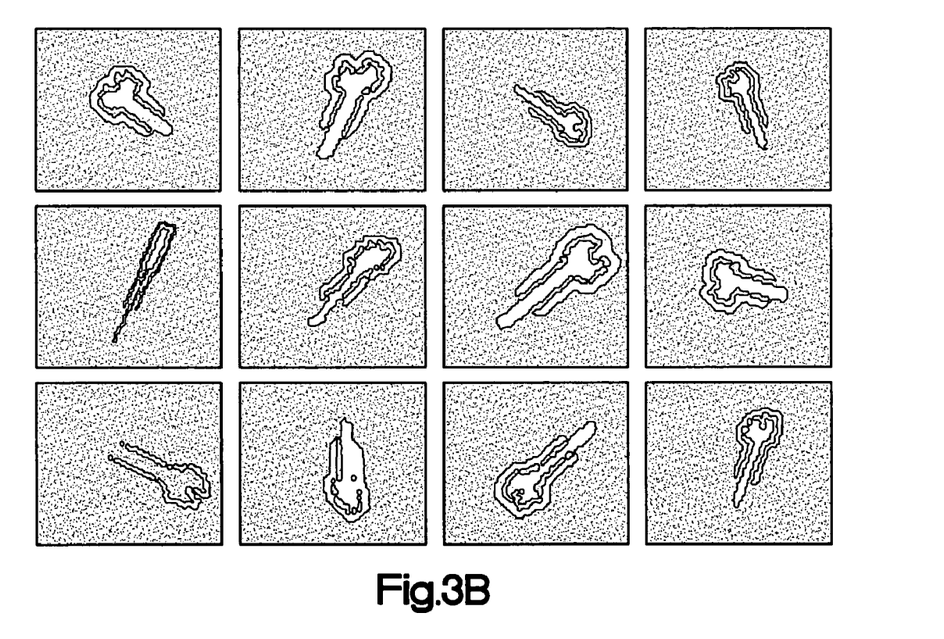
Figure 4A:
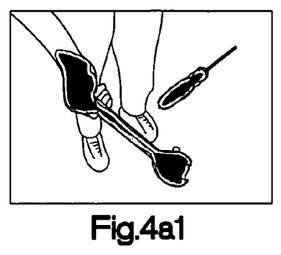
Figure 4A:
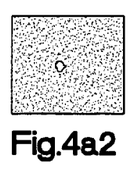
Figure 4A:
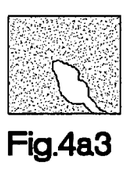
Figure 4A:
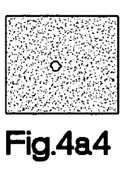
Figure 4A:
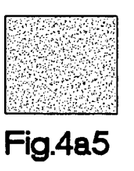
Figure 4B:
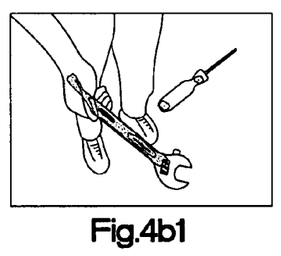
Figure 4B:
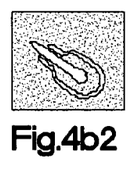
Figure 4B:
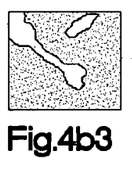
Figure 4B:
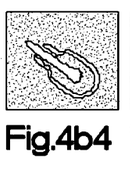
Figure 4B:
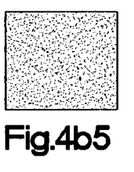
Figure 4C:
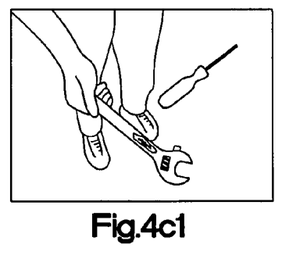
Figure 4C:
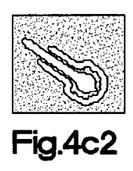
Figure 4C:
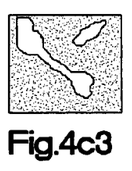
Figure 4C:
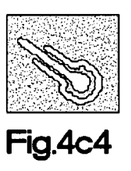
Figure 4C:
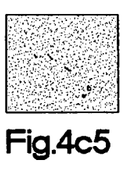
Figure 4D:
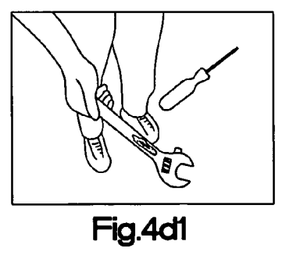
Figure 4D:
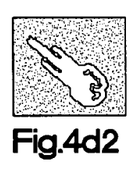
Figure 4D:
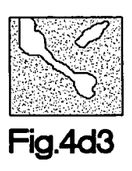
Figure 4D:
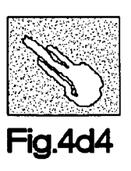
Figure 4D:
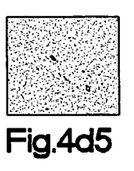

The free space surrounding the targeted object is actually what defines the shape of an object's silhouette. For this reason, an object is searched for by matching to the empty space, exterior to the silhouette, using mask templates as well as to interior "matter" which composes the object itself using shape templates. Two dimensional shape and mask templates are used in step 740 to locate candidate target objects and in step 770 to eliminate possible target object poses. FIG. 3A shows an example of a set of shape templates that can be used to locate a wrench and FIG. 3B shows an example of a set of mask templates that can be used to locate a wrench. By matching against the entire silhouette of an object, some of the drawbacks to edge based matching can be avoided. The halo region in a mask template is generated by subtracting the silhouette probability profile from a dilated version of itself. The negative halo area is sized so that it equals the area of the positive silhouette region.

Using templates to search a scene for complex objects presents the potential for a combinatorial explosion. This is especially true if the full six degrees of freedom (6-DOF) pose of a complex object is required and the scene is cluttered with other objects and artifacts. If real-time performance is an issue, then it is important that template matches be made efficiently. One common algorithm for matching patches of grayscale, LOG, or color imagery is the Least Sum-of-Squares difference algorithm. As the name implies, the degree of correlation is inversely proportional to the sum of squares of pixel value differences between template and image patches. Though effective, this computation is time consuming; each element requires at least eight bits and squaring requires multiplication (or significant table look-up).

To estimate object pose within binary range maps, binary shape and mask templates are used in steps 740 and 770 to determine how many bits of the range map match bits in the shape template and how many bits of the range map fall outside the shape template and into the halo region of the mask template. Match correlation values are simply computed by summing the XOR results between individual binary pixels and accumulating a match value score. By keeping data compact and the operations simple, the use of binary templates is relatively fast. Using the Multi-Media registers available on conventional desktop processors, entire rows of a binary-packed template can be accessed with a single instruction, and bit-wise matching can be performed in parallel. By implementing a relatively fast matching process, a large number of templates can be used to estimate pose in a reasonable amount of time.

Several successive stages of pruning are employed during the template matching process of step 770. A small set of templates is generated that will likely capture the target object in any pose within the given domain. This set of templates is generic (liberal) in form, and as a side effect, non-targeted objects may also match. Successive stages use templates that are increasingly specific to the target object. As the templates become more specific, they increase in fidelity; shapes are sharper making matching requirements more precise. Upon each stage foreign (non-targeted) objects are weeded out and only target objects remain.

High fidelity matching occurs after significant pruning is performed by earlier stages. Many more templates are required to interrogate a candidate location, but only a small fraction of image pixels remain as possible poses. Templates are applied through successive stages to filter out possible target object poses within the scene until only the true pose(s) remain (and are output in step 799). Template fidelity is increased at each stage to gain an increasingly accurate estimate of object pose. Each stage re-assesses possible poses within the scene and passes only the best remaining possible poses to the next stage. Each stage narrows down the pose search by at least one degree of freedom.

Early stages use templates based on very generic models that will correlate well with the target object when viewed over a wide range of orientations. As the pose estimate improves, higher fidelity templates can be employed to gain a more precise estimate of the pose. The specific templates used at a given stage of matching are determined by the information already known about the pose and the specific DOF being interrogated by that stage. Using generic templates in the early stages typically allows for a large number of false candidate poses, but these candidate poses are increasingly weeded out in successive, higher fidelity, stages of matching.

Figure 5A:
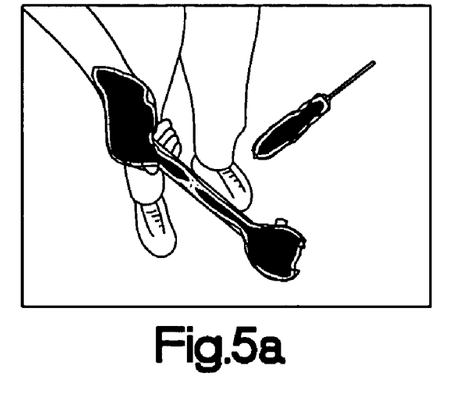
FIGS. 5a–5c illustrate a confidence sequence selective of the screwdriver of FIG. 1 according to an embodiment of the present invention.
Figure 5B:
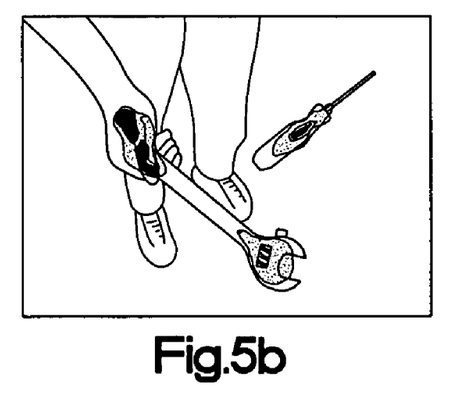
Figure 5C:
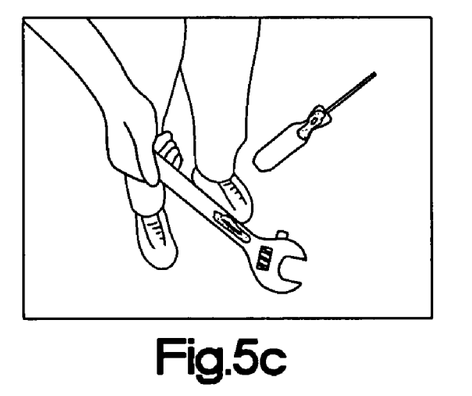

FIG. 4 illustrates pose estimation sequence for a wrench in which successively higher fidelity templates are used to zero in on the target object. The templates that are applied to each image are shown to the right of the image. The shaded areas in FIGS. 4a1, 4b1, 4c1, and 4d1 show the progressively smaller target area that is used to match against the stored shape and mask templates shown in corresponding figures. FIG. 5 illustrates a confidence sequence selective of the screwdriver of FIG. 1. The first stage of matching that estimates depth and scale is the most generic. This stage is applied to find match candidates within the scene. As already discussed, a priori knowledge about the target object's location and orientation can be used to limit the extent of the search necessary to find candidate objects and gives rise to an initial template that is relatively specific to the candidate object. If no such information is available, the most general shape match to a complex object of unknown orientation is a circular silhouette. Regardless of orientation, a circular silhouette will be contained within the silhouette of most objects. For a given object, the largest circle contained by all orientations is a good first stage shape template for matching. Applying this circular template ensures that the target object will get selected for successive (orientation determining) levels of filtering. FIG. 4a2 shows the circular template used for matching the wrench at any orientation. FIG. 4a3 shows the best match patch from the binary depth map. FIG. 4a4 shows the correlation between the template and the patch. FIG. 4a5 shows the anti-correlation between the template and the patch. The anti-correlation indicates any portions of the candidate object that extend into the halo region of the mask template. This allows the user to see graphically where templates are mismatching elements of the image and is used in the calculation of the match value score.

In the next stage, the search is narrowed for one of the components of orientation. A body-fixed reference frame (Euler) is used herein to describe orientation. A typical sequence of pose estimation stages may proceed from the initial depth stage to a stage that estimates the rotation about the Z (in-plane) axis and any orientation about the Y and X axes as shown in FIGS. 4b2-5. The estimation may then determine rotation about Z-Y at any orientation about X as shown in FIGS. 4c2-5, and finally full pose matching shown in FIGS. 4d2-5.

The pose estimation is not limited to a single-stranded candidate solution. Each stage can pursue many candidate poses, each at a different location in the scene. Each candidate pose carries its own scale and orientation estimates and is therefore subjected to an interrogation by a specifically targeted set of templates upon the next stage of matching. Object orientation is determined by matching to the three components of rotation in sequence. The best rotation order is driven by object geometry and environmental characteristics.

Each stage of pose estimation employs templates designed to capture a specific degree of freedom (DOF, component of orientation). A stage must be capable of capturing its target DOF while remaining tolerant to undetermined DOFs. To achieve this flexibility, early stages must employ liberal silhouettes, which tend to be fuzzy depictions of the target object. Latter stages, which have less undermined DOFs can afford to apply higher fidelity templates, which more accurately reflect the appearance of the target object. In the final stage, the templates are true 2D silhouettes of the target object, providing the greatest pose estimation in all DOFs.

Shape Templates from Probabilistic Silhouettes

The silhouettes used in each stage of matching are generated statistically, based on the undetermined DOFs for that stage. At each stage of matching, a set of templates is used to better determine a target object's pose. The shape of the model, used to generate the templates, needs to be discriminate enough to "force" a fit to the target DOF, yet liberal enough to allow for variability in the remaining DOFs. The model can be generated empirically; from a series of depth maps of the object itself, or from a 3D model of the object. From a 3D model, 2D silhouettes of the object as seen from any distance or orientation can be generated.

Figure 6A:
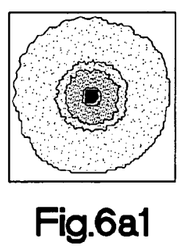
FIG. 6 illustrates probability silhouettes for multi-phase pose matching of the wrench of FIG. 1 according to an embodiment of the present invention.
Figure 6A:
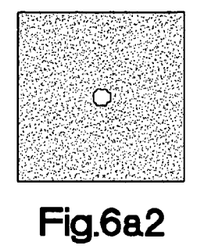
Figure 6A:
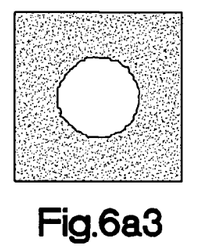
Figure 6A:
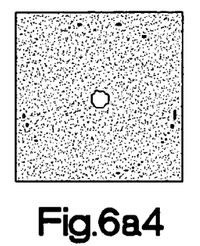
Figure 6B:
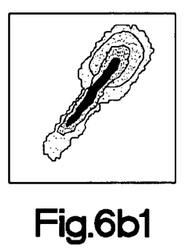
Figure 6B:
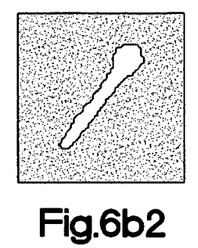
Figure 6B:
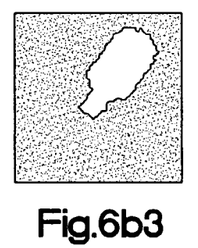
Figure 6B:
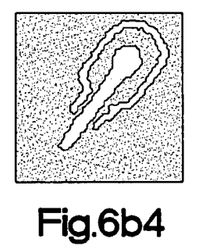
Figure 6C:
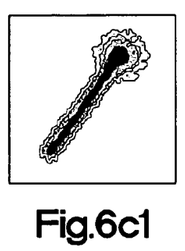
Figure 6C:
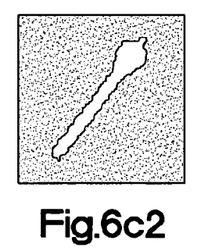
Figure 6C:
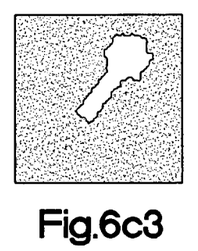
Figure 6C:
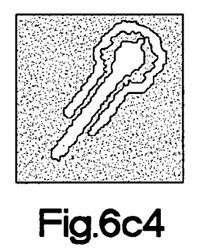
Figure 6D:
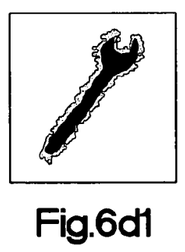
Figure 6D:
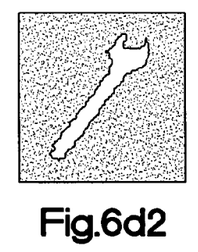
Figure 6D:
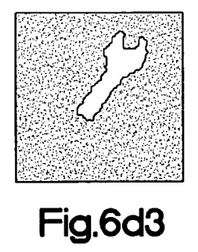
Figure 6D:
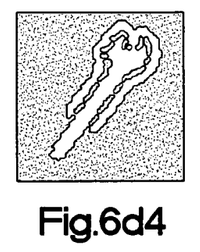

The set of shape templates, used within any given stage, are derived form the same model. If the stage is used to determine a component of orientation, then the templates depict views of the model rotated about a single axis. To capture the target object, the model must be relaxed in all remaining DOFs. For this purpose, a model is generated statistically from an exhaustive set of possible object (real or simulated) silhouettes. All silhouettes are effectively merged, resulting in a silhouette probability profile. Each value in the profile represents the probability of occupancy by the target object's silhouette, within a given match stage. FIG. 6 shows a set of probability silhouettes for multi-stage pose matching for a wrench. FIG. 6a1 shows a probability silhouette of a wrench at any orientation (Z-Y-X). FIG. 6a2 shows a representative binary shape template generated from the probability silhouette of 6a1. FIG. 6a3 shows a silhouette of the non-grasped portion of the wrench. FIG. 6a4 shows the masked template used to match the wrench at any orientation. The 6b figures show the shape templates used to match against any orientation about Y-X. The 6c figures show the shape templates used to match against any orientation about X. The 6d figures show the silhouettes used to match the exact pose of the wrench.

The template shape model is generated by thresholding the silhouette probability profile. The threshold must be chosen based on the application. A threshold that is conservative (low) may generate a template that is too small to discriminate between different orientations or objects. A threshold that is liberal (high) may generate a template that is too large to capture object orientations that present small silhouettes.

All shape templates are generated in advance and maintained in memory. A full set of 64×64 bit templates for the wrench requires about 40 megabytes. When needed for matching, template subsets are referenced indirectly through arrays of pointers.

As can be seen from the foregoing description, by applying stages of more discriminating binary templates to a binary map extracted from a target environment, the pose of a target object can be estimated. Although the present invention has been described with a degree of particularity, it is the intent that the invention include all modifications and alterations from the disclosed design falling within the spirit or scope of the appended claims.

I claim:

1. A method for approximating a target object's pose from a range measurement device generated image of a target environment comprising the steps of:
   generating a range image of the target environment;
   extracting a binary map from the range image by filtering the range image to include silhouettes of objects located within a predetermined range of distances from the range measurement device;
   determining the location of a target object silhouette;
   iteratively applying stages of binary templates to each target object silhouette with each stage representing a range of possible poses of the target object; wherein each stage includes shape templates that represent a merger of all possible object silhouettes that result when the target object is rotated about all undetermined axes for a given stage of template application and mask templates that correspond to empty regions surrounding the target object when it is in a corresponding pose; and wherein each stage represents a higher spatial fidelity than the previous stage such that each stage reduces a number of possible poses of the target object; and
   approximating the target object's pose by computing a match score between the target object silhouette and the binary shape and mask templates and wherein poses represented by binary templates yielding relatively high scores are selected as the approximate target object pose.

2. The method of claim 1 wherein the step of determining the location of the target object silhouette is performed by applying an initial binary shape template to the binary map that is a largest circle that is contained in all silhouettes of the target object, regardless of orientation.

3. The method of claim 1 wherein the step of determining the location of the target object silhouette is performed by determining a base location of a predetermined component and fixing a location of the target object based on the base location.

4. The method of claim 1 wherein the step of applying the binary template to the target silhouette is performed by performing an XOR operation between pixels in the target object silhouette and the template and summing the results of the XOR.

5. For use with a computer vision system, an apparatus for approximating a target object's pose from a range measurement device generated image of a target environment comprising the steps of:
   a range image generator for generating a range image of the target environment;
   a binary map extractor for extracting a binary map from the range image by filtering the range image to include silhouettes of objects located within a predetermined range of distances from the range measurement device;
   a target object silhouette locator for determining the location of the target object silhouette;
   a binary template applicator for iteratively applying stages of binary templates to each target object silhouette with each stage representing a range of possible poses of the target object; wherein each stage includes shape templates that represent a merger of all possible object silhouettes that result when the target object is rotated about all undetermined axes for a given stage of template application and mask templates that correspond to empty regions surrounding the target object when it is in a corresponding pose; and wherein each stage represents a higher spatial fidelity than the previous stage such that each stage reduces a number of possible poses of the target object; and
   a pose selector for approximating the target object's pose by computing a match score between the target object silhouette and the binary shape and mask templates and wherein poses represented by binary templates yielding relatively high scores are selected as the approximate target object pose.

6. The method of claim 5 wherein the target object locator determines the location of the target object silhouette by applying an initial binary shape template to the binary map that is a largest circle that is contained in all silhouettes of the target object, regardless of orientation.

7. The method of claim 5 wherein the target object locator determines the location of the target object silhouette by determining a base location of a predetermined component and fixing a location of the target object based on the base location.

8. The method of claim 5 wherein the binary template applicator applies templates to the target silhouette by performing an XOR operation between pixels in the target object silhouette and the template and summing the results of the XOR.

* * * * *